Dec. 28, 1965     M. V. MHATRE     3,226,430
SULFONATION OF CYCLOHEXYLAMINE WITH SO$_3$ SULFONATION
Filed April 7, 1964
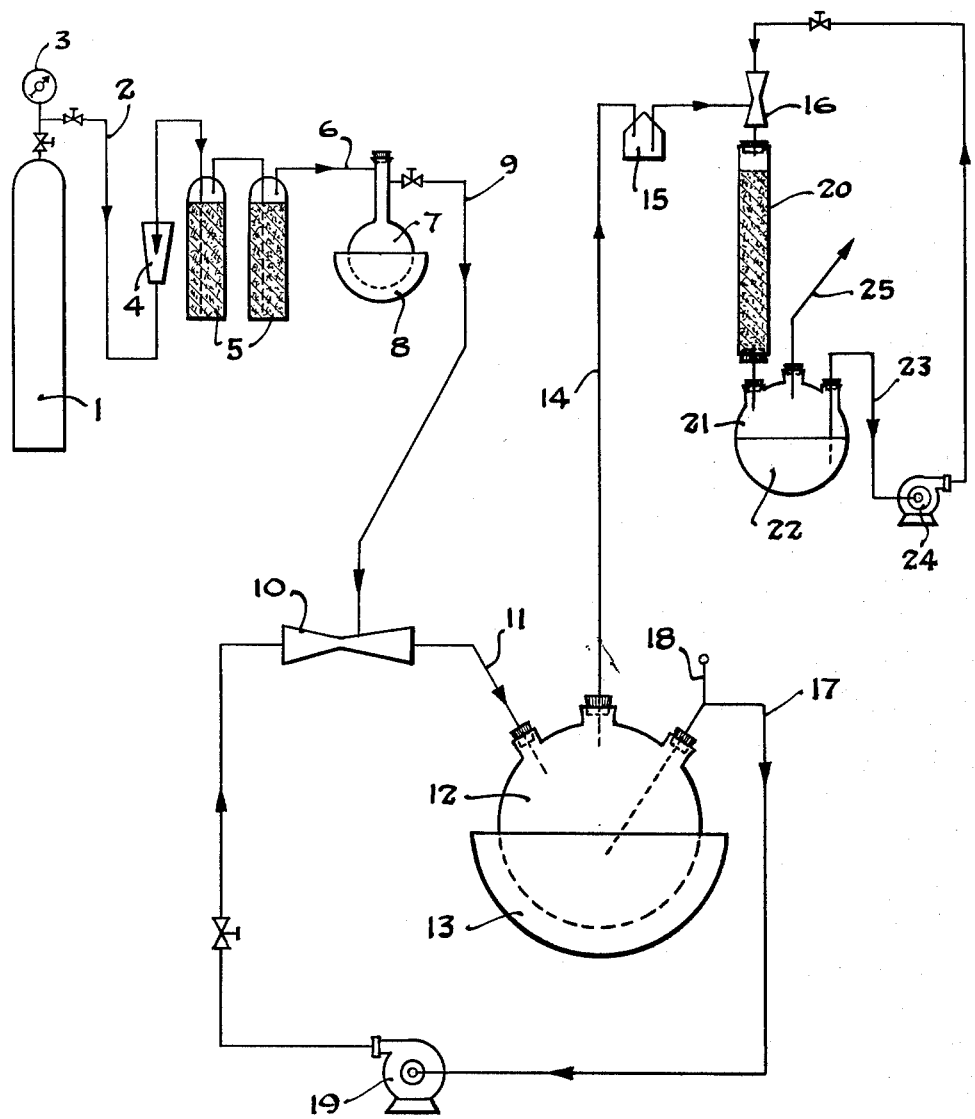
Inventor
MADHUKAR V. MHATRE
By Paul D Burgauer
Agent 3,226,430
SULFONATION OF CYCLOHEXYLAMINE WITH SO₃
Madhukar V. Mhatre, Bareilly, Uttar Pradesh, India, assignor to Abbott Laboratories, North Chicago, Ill., a corporation of Illinois
Filed Apr. 7, 1964, Ser. No. 359,546
9 Claims. (Cl. 260—501)

The present application is a continuation-in-part application of my copending application S.N. 175,503, filed February 26, 1962, now abandoned.

The present process relates to the manufacture of the amine salt cyclohexylamine cyclohexylsulfamate which is the precursor for the preparation of cyclohexylsulfamic acid. The alkali and alkali earth salts of this acid are widely used as artificial sweetening agents.

Cyclohexylamine cyclohexylsulfamate heretofore has mainly been made by treating cyclohexylamine with sulfamic acid or sodium chlorosulfamate. These processes, in spite of being based on the straightforward approach, are very expensive due to the use of expensive starting materials, sulfamic acid and sodium chlorosulfamate respectively, and more economical processes for the manufacture of cyclohexylsulfamic acid and its salts have been investigated for many years.

More recently, it has been proposed to treat cyclohexylamine with sulfuric acid anhydride, which results in the formation of cyclohexylamine cyclohexylsulfamate which, in turn, decomposes in the presence of an alkali hydroxide to the alkali salt of cyclohexylsulfamic acid. These reactions take place according to the following equations:

(1)

$2C_6H_{11}NH_2 + SO_3 = C_6H_{11}NHSO_3NH_3C_6H_{11}$ (amine salt)

(2)

$C_6H_{11}NHSO_3NH_3C_6H_{11} + MOH$
$= C_6H_{11}NHSO_3M + C_6H_{11}NH_2 + H_2O$ wherein M is an alkali metal cation.

The present invention is concerned with the first step of the above reaction. According to this invention, very rapid and continuous manufacture of the amine salt is possible at very high conversion rates.

According to the literature, this reaction is quite exothermic and the reaction mixture has to be cooled vigorously to prevent overheating and charring in local areas, and to prevent a side reaction which proceeds according to the following equation:

(3)

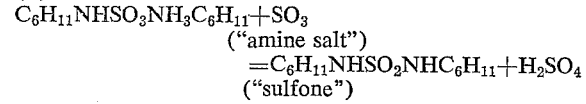
$C_6H_{11}NHSO_3NH_3C_6H_{11} + SO_3$
("amine salt")
$= C_6H_{11}NHSO_2NHC_6H_{11} + H_2SO_4$
("sulfone")

The reaction characterized by Equation 3 produces bis(cyclohexylamine)sulfone, hereinafter simply referred to as "sulfone." It is an objectionable by-product which not only reduces the yield of the desired amine salt but also causes the solution containing the desired amine salt to become very difficult to work up.

It is therefore an object of the present invention to provide a process for the manufacture of cyclohexylamine cyclohexylsulfamate, hereinafter simply referred to as "amine salt," whereby the formation of "sulfone" as well as sulfate is substantially suppressed. It is another object to provide a process for the manufacture of the above "amine salt" in high yields. It is another object to provide a new process for the manufacture of the above "amine salt" of exceptional purity. Other objects will be apparent from the following disclosure and the appended claims.

These objects are accomplished by reacting dry cyclohexylamine with dry sulfur trioxide in a zone of high turbulence and at a temperature above 70° C. whereby the ratio of the reactants is selected in such a way that cyclohexylamine is present in at least a tenfold excess over the amount of sulfur trioxide when calculated on a molecular basis.

It has been found, against all expectations, that the above-mentioned temperature limitation is necessary to obtain high yields of exceptionally pure "amine salt." According to previous findings, this exothermic reaction had to be controlled in such a way that the maximum temperature attained would not exceed 50° C. and preferably should be considerably below this limit. However, according to the present process, much better and fully unexpected results are obtained by carrying out this reaction at a considerably higher temperature, i.e. a temperature previously considered inapplicable for this exothermic process.

The new process operates at above 70° C. and below the decomposition temperature of the "amine salt." This decomposition temperature is about 193° C. so that the reaction is preferably carried out between about 70° and 190° C. Instead of preventing overheating by cooling or mechanical agitation, the present invention avoids such a possibility by bringing the reactants together under conditions of turbulence and in such a manner that for each mole part of sulfur trioxide at least 10 mole parts of cyclohexylamine are present in the turbulent reaction zone. Adequate turbulence is provided, for instance, by mixing the reactants in an ejector, a Venturi tube, a packed column or similar equipment providing instantaneous mixing of the reactants. The sulfur trioxide is preferably diluted with an inert gas such as nitrogen or dry air.

The present invention is better understood by reference to the sole figure of the appended flow sheet. This flow sheet represents a semi-continuous operation for the process.

Nitrogen gas stored in pressure cylinder 1 flows through connecting tube 2 coupled with pressure gauge 3 through flow meter 4 into a plurality of gas driers filled with silica gel or similar drying agents from where it is led through connecting pipe 6 into sulfur trioxide vaporizer 7 containing a predetermined amount of sulfur trioxide. Heating mantle 8 provides the necessary heat to vaporize sulfur trioxide which mixes in connecting tube 9 with the dry nitrogen and flows into ejector 10, wherein it mixes with recirculating cyclohexylamine in a molar ratio of between 1:10 and 1:200. Connecting tube 11 leads the reaction mixture into storage vessel 12 which is provided with heating mantle 13. Storage vessel 12 is a three-neck flask provided with liquid outlet tube 17 connected to thermometer 18 and vent gas outlet tube 14. The mixture of formed reaction products, e.g., "amine salt" and cyclohexylamine is recirculated through pump 19 back to ejector 10. The vent gas consisting of nitrogen and containing a considerable amount of vaporized cyclohexylamine and some finely divided "amine salt" is led through safety flask 15 into small ejector 16. From this ejector the vent gases are led through vent gas scrubber 20 into three-neck flask 21 containing cyclohexylamine or water 22. Outlet tube 23 for liquids connects through recirculating pump 24 back to ejector 16. Outlet tube 25 leads the purified, stripped carrier gas to vent. Vent gas scrubber 20 may be a packed column, a vigreux-type tube, or a similar system providing a large contact area.

The recirculating system 10–11–12–17–19–10 originally contains cyclohexylamine in a 10- to 30-fold molar excess over the molar amount of sulfur trioxide in vaporizer 7.

When dry nitrogen gas carrying the sulfur trioxide gas into ejector 10 comes into contact with the cyclohexylamine of the above recirculating system, instantaneous reaction between sulfur trioxide and cyclohexylamine takes place in ejector 10. Connecting tube 11 carries a mixture of excess cyclohexylamine and formed reaction products into storage container 12. The reaction is interrupted when all sulfur trioxide is vaporized.

During the recirculating operation and reaction period, heating mantle 13 is heated in such a manner that the recirculating cyclohexylamine/"amine salt" mixture is at a temperature between about 70° and about 190° C. If the recirculating cyclohexylamine is kept at a temperature above its normal boiling point at 134.5° C., the system obviously must be kept under pressure. After completion of the reaction, storage vessel 12 is cooled, whereupon most of the formed "amine salt" crystallizes. The slurry of "amine salt" crystals and excess cyclohexylamine is then centrifuged in the cold. The supernatant, still containing a small percentage of "amine salt," can be reused for a subsequent reaction.

*Example 1*

In the arrangement of FIGURE 1, the two-liter, three-neck, round-bottom flask 12 is charged with 1000 ml. of dry cyclohexylamine. The cyclohexylamine is then recirculated through pump 19 into ejector arrangement 10 and warmed up to 70° C. by heating mantle 13. The three-neck flask 21 is charged with 1000 ml. of cyclohexylamine.

Vaporizer 7 is charged with 10 ml. of liquid sulfur trioxide and heated externally with heating mantle 8. Nitrogen, at a pressure slightly above atmospheric and dried over silica gel columns 5, is passed through the vaporizer at about 0.18 ft.$^3$ per minute. Vapors of sulfur trioxide (about 0.31 g. per minute) along with nitrogen ($SO_3$ concentration of about 4.5 weight percent) are sucked into ejector 10. Reaction between cyclohexylamine and sulfur trioxide takes place instantaneously in the ejector. The "amine salt" thus formed is recirculated along with cyclohexylamine. The vent gases are scrubbed in column 20 with recirculating cyclohexylamine.

After about one hour all the sulfur trioxide is vaporized. The reaction and scrubber liquors are mixed and the cyclohexylamine is distilled off and replaced by water as shown in detail in Example 3. The aqueous solution is assayed for sulfate impurities. It analyzes 84.7% "amine salt," 14.8% cyclohexylamine sulfate, and 0.5% bis(cyclohexylamino)sulfone on a dry basis.

In a repetition of this process, the amount of sulfur trioxide is not limited. The process can be continued until the recirculating cyclohexylamine contains a total of about 15% by weight of solids. At a reaction temperature of 135° C., the reaction can be carried on until the recirculating phase contains about 20% of solids. For economical operation, the process should always be continued until the reaction mixture contains at least 5% by weight of total solids.

*Example 2*

By carrying out the above reaction at 110° C. with 0.21 gram per minute of sulfur trioxide and 0.0705 cubic feet per minute of nitrogen, the analyzed yield is 85.2% "amine salt," 12.6% cyclohexylamine sulfate, and 2.2% bis(cyclohexylamino)sulfone.

In a repetition of this example at 100° C., substantially identical distribution of product and by-products is obtained.

*Example 3*

A mixture from a similar run as described in Example 2, containing 52 grams of "amine salt," 8 grams of cyclohexylamine sulfate, an amount of less than 2 grams of "sulfone" and about 900 ml. of cyclohexylamine is concentrated to a volume of about 500 ml. To this concentrate, 2000 ml. of water are added and the remaining cyclohexylamine is distilled off azeotropically. The aqueous solution is then treated with about 15 grams of activated carbon, filtered, and concentrated to a volume af about 400 ml. After cooling, the formed crystals of "amine salt" are filtered off, washed with water, and dried. With the filtrate, this procedure of concentrating, cooling, and filtering is repeated to get a second crop. This process is repeated until the obtained crystals analyze a measurable amount of cyclohexylamine sulfate. The first four crystallizations are all sulfate-free and yield a total of 48.2 grams of pure, sulfate-free and "sulfone"-free cyclohexylamine cyclohexylsulfamate or 93% of theory.

*Example 4*

In a run similar to that described in Example 1, the following process parameters are used: nitrogen temperature 108° C., cyclohexylamine temperature 145° C.; mole ratio of cyclohexylamine to sulfur trioxide 152:1; sulfur trioxide rate 9.5 ml. per minute, nitrogen rate 10 cubic feet per minute. After 6 hours, the process is interrupted and the reaction mixture is worked up and analyzed as above. The solids analyze 91.5% "amine salt," 8.6% cyclohexylamine sulfate, and 0.9% "sulfone."

Although the above examples are directed to a semi-continuous process with re-circulating cyclohexylamine containing (at least after a short reaction period) an appreciable amount of "amine salt," this process can also be carried out in a manner whereby cyclohexylamine is not recycled. In that modification, the preheated cyclohexylamine is injected into a turbulence zone together with the appropriate amount of sulfur trioxide. The latter is preferably diluted with an inert gas such as nitrogen. The reaction mixture then passes through a heated column which provides a large contact area for removal of entrained solids. This column can be filled with Raschig rings or may contain baffle plates or the like. The mixture then enters a liquid/gas separation device which separates the product slurry or solution from the carrier gas which contains cyclohexylamine vapors. The liquid product solution or slurry is withdrawn for further processing and cyclohexylamine is recovered from the carrier gas by conventional means. In this manner, the present process provides a means for continuous manufacture of "amine salt" of excellent quality and yield.

From the above illustrations it will be apparent that by increasing the reaction temperature, increased yields of "amine salt" are obtained, while the amounts of by-products decrease at the same rate. Thus, operating the present process at about 100° C. or above will give best results, although the process is also economically feasible at 70° C. The operable range of 70°–190° gives "amine salt" yields well above those expected in view of older processes.

When equipment allowing only low pressure operations is to be used, a practical upper process temperature of about 150° C. is indicated. With equipment permitting higher pressures, e.g., above 15 p.s.i.g., the process may be used at temperatures up to just below the decomposition temperature of the "amine salt." Reaction temperatures between 100° and 150° C. consistently produce yields of "amine salt" above 80% of theory, when operating within the parameters of the new process.

From the above description it will be appreciated by those skilled in the art that it is important to exclude water or moisture from the reaction vessel since water has a high affinity towards sulfur trioxide which would lead to the formation of by-products. Thus, cyclohexylamine should be dried prior to its use for the present process and the carrier gas for sulfur trioxide also should be carefully dried. Drying of cyclohexylamine can be achieved by using one of the well-known inert drying agents such as barium oxide, silica gel, magnesium sulfate, etc. The inert gas is preferably dried by bubbling it through cylinders filled with drying agents for the particular inert gas used, e.g., sodium hydroxide pellets, silica gel, concentrated sulfuric acid, and the like.

Although, for convenience, the above illustrations referred to nitrogen as the carrier gas for sulfur trioxide, other carrier gases can be used with equal success. Among these gases are air, helium, krypton, and similar inert gases. However, when air is used as the carrier gas, carbon dioxide should be removed therefrom, which can be accomplished by leading the air, before its use, through a de-moisturizing column containing sodium hydroxide pellets. The sulfur trioxide and/or the cyclohexylamine used in the process of the present invention may, if desired, be diluted with a dry, inert diluent which is a liquid at room temperature and which is miscible with cyclohexylamine.

To those skilled in the art it will be obvious that the above outlined process can be carried out with a number of mechanical modifications. In one of these modifications, the contact between sulfur trioxide and cyclohexylamine takes place in an Adjust-o-Film unit (manufactured by the Kontro Co.) wherein a similar turbulence effect is obtained with simultaneous centrifugation of the reaction material to the outside walls of this Adjust-o-Film unit. From there the slurry is discharged through a separating device from which the liquid phase, i.e., the cyclohexylamine is forwarded to a storage tank from which it is recirculated into the reactor after being brought to the desired reaction temperature. If desired, the separating device can be preceded or replaced by a concentrator or evaporator. Operating in this manner provides for a completely continuous operation whereby the reactants again are supplied to the contacting unit in a ratio of at least ten moles of cyclohexylamine per mole of sulfur trioxide. In a further modification, the Venturi tube can be followed by a packed column with concurrent flow of liquid and gas.

It is particularly surprising that the present process can be carried out at such elevated temperatures without causing the formation of substantial amounts of "sulfone" according to the above Equation 3, since the recirculating cyclohexylamine contains a substantial amount of "amine salt" which continuously comes into contact with sulfur trioxide in the ejector or similar turbulence-providing equipment.

Others may practice the invention in any of the numerous ways which will be suggested to one skilled in the art by the present disclosure. All such practice of the invention is considered to be a part hereof provided it falls within the scope of the appended claims.

I claim:
1. The process of making cyclohexylamine cyclohexylsulfamate, comprising the step of
   contacting dry cyclohexylamine with dry sulfur trioxide vapors in such a manner that at least 10 mole parts of cyclohexylamine contact 1 mole part of sulfur trioxide in a zone of turbulence, at a temperature above 70° C.
2. The process of claim 1 wherein said ratio of reactants is achieved by diluting the sulfur trioxide with an inert gas.
3. The process of claim 2 wherein said inert gas is nitrogen.
4. The process of claim 1 wherein said reactants are contacted with one another at a temperature between 100° and 150° C.
5. The process of claim 1 wherein the product mixture is recirculated and the process is continued until the recirculating phase contains at least 5% by weight of solids.
6. The process of making cyclohexylamine cyclohexylsulfamate substantially free of bis(cyclohexylamine)sulfone and at a favorable yield, comprising the step of introducing liquid dry cyclohexylamine and dry vapors of sulfur trioxide and an inert gaseous diluent into a reaction zone under conditions of turbulence, the ratio of the rate of introduction of cyclohexylamine to the rate of introduction of sulfur trioxide being at least 10 mole parts of cyclohexylamine to 1 mole part of sulfur trioxide at a temperature above 70° C. and below the decomposition temperature of cyclohexylamine cyclohexylsulfamate, and continuously removing from the reaction zone the diluent, excess cyclohexylamine and reaction products.
7. The process of claim 6 where the temperature is between 100° C. and 150° C.
8. The process of claim 6 where the temperature is substantially 135° C.
9. The process of claim 6 where the sulfur trioxide vapors are diluted with an inert gas to an amount of less than 10 weight percent sulfur trioxide.

References Cited by the Examiner

UNITED STATES PATENTS

| | | | |
|---|---|---|---|
| 2,275,125 | 3/1942 | Audrieth et al. | 260—500 |
| 2,826,605 | 3/1958 | Thompson | 260—500 |
| 2,828,331 | 3/1958 | Marisic et al. | 260—505 |
| 3,056,831 | 10/1962 | Stratford et al. | 260—505 |
| 3,090,806 | 5/1963 | Yamaguchi et al. | 260—501 |

FOREIGN PATENTS 791,995  3/1958  Great Britain.

OTHER REFERENCES

Audrieth et al. (II), Chem. Reviews, vol. 26, 1940, pp. 58–61.

Audrieth et al. (III), J. Org. Chem., vol. 9, 1944, pp. 89–95.

Groggins, Unit Processes in Organic Synthesis, 5th ed., 1958, pp. 306–310.

LORRAINE A. WEINBERGER, *Primary Examiner.*

B. EISEN, *Examiner.*